United States Patent [19]
Layden

[11] 3,821,005
[45] June 28, 1974

[54] DENSIFICATION OF SILICON NITRIDE

[75] Inventor: George K. Layden, Glastonbury, Conn.

[73] Assignee: United Aircraft Corporation, East Hartford, Conn.

[22] Filed: May 18, 1973

[21] Appl. No.: 361,678

[52] U.S. Cl.................................. 106/55, 106/73.5
[51] Int. Cl............................................ C04b 35/58
[58] Field of Search.......... 106/55, 39.5, 73.4, 73.5

[56] References Cited
UNITED STATES PATENTS
3,468,992   9/1969   Lubatti et al.................. 106/73.5

Primary Examiner—James E. Poer
Attorney, Agent, or Firm—Richard N. James

[57] ABSTRACT

Novel sintering aids are added to silicon nitride powders to permit hot pressing to high density with superior strength retention at high temperatures.

3 Claims, No Drawings

DENSIFICATION OF SILICON NITRIDE

BACKGROUND OF THE INVENTION

The present invention relates in general to the field of ceramics and particularly to the preparation of dense articles by the powder metallurgy processing of silicon nitride.

Metals and alloys are by their very nature inherently limited in terms of their temperature capabilities. In many fields, such as the gas turbine engine industry, the available alloys have been pushed to their practical limits. To satisfy the demands of the designers for engine materials possessing useful strengths at very high temperatures attention has quite naturally been directed to the ceramics which, from the standpoint of their high temperature capabilities, easily surpass the vast majority of the metallic materials. Unfortunately, the tensile and impact strengths of the typical ceramics are so low that they are not in fact usable in many important applications for which they might otherwise be well suited.

Of the ceramics, because of its relatively high tensile strength, and good oxidation and thermal shock resistance, silicon nitride ($Si_3N_4$) has recently shown some promise for gas turbine engine component use.

Silicon nitride does pose some fabrication problems. It is impossible to hot press this material to high density without the use of sintering aids. Such aids are available, however. The prior art discloses the use of small additions of magnesium oxide and other magnesium bearing compounds, such as $Mg_3N_2$ and $MgO - SiO_2$, as sintering aids. Using an addition of approximately five weight percent magnesium oxide it is possible to hot press silicon nitride to near theoretical density at a temperature of 1,650°C. and a pressure of 4,000 p.s.i.

Material prepared to the above recipe has been found to display a useful modulus of rupture of around 100,000 p.s.i. when tested at room temperature. Unfortunately, when tested at 1,300°C. the modulus of rupture was only about 30,000 p.s.i.

SUMMARY OF THE INVENTION

I have found that the addition of a certain combination of sintering aids to silicon nitride powders will not only permit complete densification of the powders at reasonable conditions of temperature and pressure, but will also provide articles which exhibit superior strengths at elevated temperatures. These new sintering aids are certain mixtures of aluminum and/or gallium together with phosphorus and/or arsenic wherein the metal ion ratio (aluminum + gallium)/(phosphorus + arsenic) is unity or near unity.

In accordance with the present invention, therefore, there is added to the silicon nitride powders, such additives as $AlPO_4$, $GaPO_4$, $AlAsO_4$, $GaAsO_4$, $AlP$, $GaP$, $AlAs$, $GaAs$ and mixtures of the foregoing. In addition many other substances will serve the desired purpose when introduced in the appropriate mixtures, such as ($3AlN + P_3N_5$) and ($3GaN + P_3N_5$).

DESCRIPTION OF THE PREFERRED EMBODIMENTS

Example 1

5 weight percent $GaPO_4$ was added to $\alpha$ $Si_3Ni_4$ powder and the mixture was ball milled for 72 hours using $Al_2O_3$ grinding balls and a methanol grinding medium. The mixture was then dried and a 12 gram sample was hot pressed in a graphite mold in a nitrogen atmosphere at a pressure of 4,000 p.s.i. and a temperature of 1,650°C. The sample was then ground smooth and cut into several test specimens approximately 0.1 inch by 0.2 inch by 1.5 inches.

The modulus of rupture (three point bend strength) of the specimens was determined at both room temperature and at 1,300°C. The values were:

Room temperature – 100,000 p.s.i.
1,300°C. – 42,000 p.s.i.

Example 2

5 weight percent $AlPO_4$ was added to $Si_3N_4$ and samples were prepared and tested as described in Example 1. The results were:

Room temperature – 80,000 p.s.i.
1,300°C. – 50,000 p.s.i.

Those skilled in the art will recognize that the pressures and temperatures utilized in the consolidation process are conventional and satisfactory results are achieved over a substantial range of temperatures and pressures. As long as densification is complete, the particular pressures and temperatures selected will be primarily a matter of convenience in view of available apparatus.

The particular quantity of the sintering aid added is similarly not particularly critical. Enough must be present to provide the desired complete densification at the pressing conditions selected but not so much as to destroy the properties of the densified article.

In selecting one particular additive in preference to another, the end utility of the article will normally be considered. Also, economics and availability may play a role in the selection process. Article strength alone may be the only consideration. However, in addition to strength other properties such as oxidation resistance may also be of paramount importance. In both of the above examples it was found that the oxide films which formed when the specimens were heated in air at 1,300°C. formed protective barriers affording excellent oxidation resistance.

Although my invention has been described in detail with reference to several examples and preferred embodiments for the sake of illustration, the invention in its broader aspects is not limited to the specific details described but departures may be made from such details without departing from the principles of my invention and without sacrificing its chief advantages.

I claim:

1. A fully dense, consolidated powder article consisting essentially of silicon nitride admixed with a small amount of at least one element selected from the first group consisting of aluminum and gallium and at least one element selected from the second group consisting of phosphorus and arsenic, the metal ion ratio of the elements of the first group to the elements of the second group being approximately unity.

2. An article according to claim 1 wherein: the modulus of rupture at 1,300°C. is at least 40,000 p.s.i.

3. An article according to claim 2 wherein: the article is resistant to oxidation at 1,300°C.

* * * * *